United States Patent [19]
Matsumoto

[11] Patent Number: 5,865,153
[45] Date of Patent: Feb. 2, 1999

[54] ENGINE CONTROL SYSTEM AND METHOD

[75] Inventor: Hiromitsu Matsumoto, Iwata, Japan

[73] Assignee: Yamaha Hatsudoki Kabushiki Kaisha, Iwata, Japan

[21] Appl. No.: 743,988

[22] Filed: Nov. 5, 1996

[30] Foreign Application Priority Data

Nov. 7, 1995 [JP] Japan .................................. 7-289003

[51] Int. Cl.⁶ .................................................. F02B 3/00
[52] U.S. Cl. ........................................ 123/299; 123/305
[58] Field of Search .................................. 123/299, 308, 123/294, 295, 300, 305

[56] References Cited

U.S. PATENT DOCUMENTS

| | | | |
|---|---|---|---|
| 4,111,177 | 9/1978 | Regueiro | 123/295 |
| 5,078,107 | 1/1992 | Morikawa | 123/299 |
| 5,101,785 | 4/1992 | Ito | 123/299 |
| 5,170,760 | 12/1992 | Yamada et al. | 123/299 |
| 5,231,962 | 8/1993 | Otsuka | 123/299 |
| 5,271,362 | 12/1993 | Kobayashi et al. | 123/299 |
| 5,482,017 | 1/1996 | Brehob et al. | 123/299 |
| 5,492,098 | 2/1996 | Hafner et al. | 123/299 |

*Primary Examiner*—Thomas N. Moulis
*Attorney, Agent, or Firm*—KNobbe, Martens, OLson & Bear LLP

[57] ABSTRACT

An engine control system and method wherein the peak pressure in the combustion chamber can be reduced without significantly reducing engine output by supplying fuel in two segments. The first segment is begun before combustion begins and the second segment is not initiated until after combustion has been initiated and preferably after peak pressure has occurred in the combustion chamber. In this way, incipient knocking can be controlled without adversely effecting the engine performance.

54 Claims, 17 Drawing Sheets

5,865,153

ENGINE CONTROL SYSTEM AND METHOD

BACKGROUND OF THE INVENTION

This invention relates to an engine control system and method and more particularly to an improved system and method for controlling combustion and precluding knocking in engine performance.

A wide variety of sophisticated engine controls have been provided for improving engine performance. These engine controls provide a number of different advantages and control routines to achieve those advantages. Normally, the controls employ a system or methodology which prevents or reduces knocking in the engine. Knocking is a condition which occurs when the flame propagation is too rapid and spontaneous combustion or irregular combustion results. This provides not only unsatisfactory running conditions, but if prolonged, can actually cause engine damage.

Normally, the way knocking is avoided is by retarding the spark timing. Alternatively varying the amount of fuel supplied to the engine also is a way in which the knocking condition can be controlled. At times, both adjustments in spark timing and in fuel supply amount may be coupled together for the control.

The disadvantage with these previously proposed systems is that both tend to reduce the actual engine power output. However, the knocking condition generally occurs when the engine is called upon to produce a greater amount of power than normal. Thus, the reduction of power is counterproductive in the ability to obtain the desired performance.

It is, therefore, a principal object of this invention to provide an improved engine control system and method wherein knocking can be avoided or minimized and yet the engine power is not substantially reduced.

It is a further object of this invention to provide an improved method and system for operating an engine to provide knock control.

It is a further object of this invention to provide a knock control system and method for an engine that will nevertheless permit the attainment of relatively high power outputs.

The types of fuel supply systems utilized in engines fall into two general categories. One type of fuel supply system utilizes a carburetor as a charge former and thus provides an air-fuel ratio that is supplied to the engine and which does not vary significantly during a given intake cycle. The other type of system employs fuel injection, which injects a finite amount of fuel, generally once per cycle. This fuel is injected either into the induction system or directly into the combustion chamber. The fuel is generally sprayed in a single installment and hence, the actual combustion cycle in the combustion chamber is controlled primarily by the time at which ignition occurs. That is, the flame propagation and pressure buildup in the cylinder will be determined solely by the amount of fuel and the locale of the fuel patch in the combustion chamber.

Because of these factors, the engine performance cannot be totally controlled so as to provide optimum performance. That is, the combustion curve and pressure buildup in the combustion chamber is substantially fixed once the ignition time and fuel supply amount is set. This gives rise to rapid pressure buildup and high pressure peaks, which do not necessarily provide optimum performance.

It is, therefore, a still further object of this invention to provide a fuel supply system and control therefor for an engine wherein the pressure buildup in the combustion chamber during the combustion cycle can be more accurately controlled.

SUMMARY OF THE INVENTION

This invention is adapted to be embodied in a fuel supply system for an internal combustion engine that is comprised of a combustion chamber, an air charging system for delivering at least an air charge to the combustion chamber, and a fuel charging system for delivering a fuel charge to the combustion chamber. An exhaust system is provided for discharging a burnt charge from the combustion chamber.

In accordance with an apparatus for practicing the invention, a control system is provided for controlling at least some of the engine systems. This control system controls the amount of fuel delivered to the combustion chamber by the fuel charging system for each cycle to introduce the supply of fuel into the combustion chamber under at least some running conditions so that the fuel is delivered in a first segment, at least in part, before combustion occurs and a second segment beginning after combustion occurs.

In accordance with a method for practicing the invention, the engine is controlled by controlling at least some of the systems. The fuel charging system is controlled so as to supply fuel to the combustion chamber under at least some running conditions so that the fuel is delivered in a first segment, at least in part, before combustion occurs, and a second segment beginning after the initiation of combustion.

DETAILED DESCRIPTION OF THE PREFERRED EMBODIMENTS OF THE INVENTION

Figure 1:
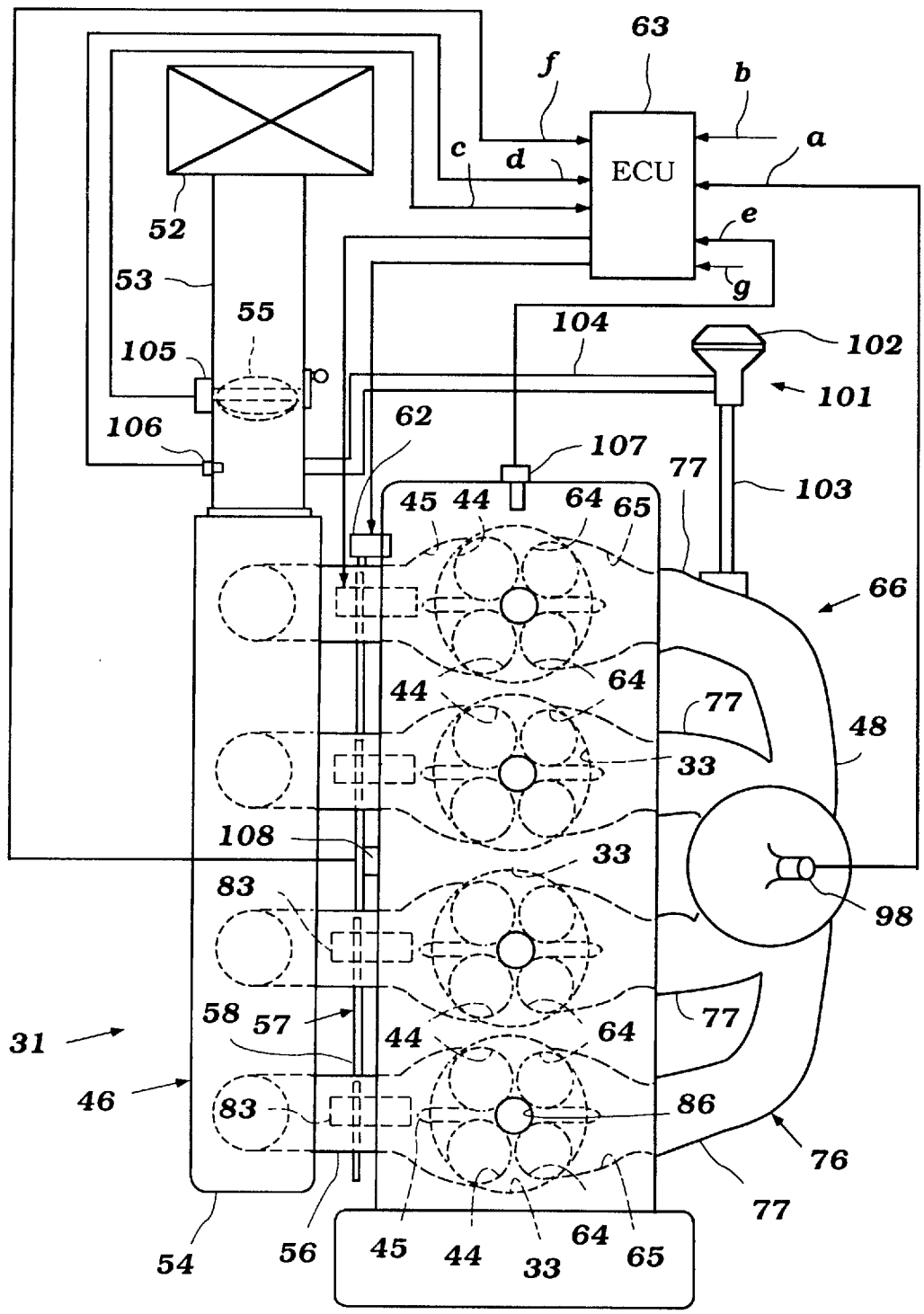
FIG. 1 is a partially schematic top plan view of an internal combustion engine constructed and operated in accordance with an embodiment of the invention.

Referring now in detail to the drawings and initially primarily to FIGS. 1–5, an internal combustion engine constructed and operated in accordance with an embodiment of the invention is identified generally by the reference numeral 31. As will become apparent to those skilled in the art, many of the constructional features of the engine 31 are relatively conventional. The invention deals primarily with the injection system, the configuration of the combustion chamber and its relationship to the fuel injector, and primarily to the control for the fuel supply and ignition control for the engine 31. Therefore, where any components of the engine 31 are not described or illustrated in detail, they may be considered to be conventional. Thus the following description of the basic architecture of the engine 31 is only to permit those skilled in the art to understand the environment in which the invention is utilized. The details of the engine, except for those features mentioned above, are exemplary only of engines with which the invention may be utilized.

The engine 31 is comprised of a cylinder block 32 that is formed with a plurality of cylinder bores 33. In the illustrated embodiment, the engine is of the four-cylinder in-line type. For the reasons already noted, however, it will be apparent to those skilled in the art how the invention can be utilized with engines having various numbers of cylinders and various configurations, such as in-line, V-type and opposed engines. In addition, certain features of the invention may also be utilized with non-reciprocating engines.

The cylinder bores 33 of the cylinder block 32 are closed at their lower end by means of a crankcase member (not shown), that is detachably connected to the cylinder block 32. A crankshaft 34 is journaled for rotation in the crankcase chamber formed by this crankcase member, in any known manner.

A cylinder head assembly 35 is affixed to the cylinder block 32 at the end opposite to the crankcase member, and closes the upper ends of the cylinder bores 33. This cylinder head 35 is formed with individual recesses 36 which cooperate with the cylinder bores 33 and pistons 37 that reciprocate in those cylinder bores to form the combustion chambers of the engine. At times, the cylinder head recesses 36 will be referred to as the combustion chambers. This is because, at top dead center (TDC), the combustion chamber recesses 36 form the substantial portion of the total volume of the combustion chamber.

The pistons 37 are connected by means of piston pins 38 to the upper or small ends of connecting rods 39. The lower ends of the connecting rods 39 are split, as at 41, so as to provide a connection to the individual journals of the crankshaft 34, as is well known in this art.

In the illustrated embodiment, the engine 31 is of the four-valve-per-cylinder type, including a pair of poppet-type intake valves 42 that are reciprocally supported in the cylinder head assembly 35 by means of valve guides 43. These intake valves 42 cooperate with valve seats formed at the combustion chamber end of intake passages 44, which extend through the cylinder head assembly 35 on one side thereof. The intake passages 44 are, in the illustrated embodiment, of the Siamese type, and terminate in a common opening 45 formed in an outer surface of the cylinder head assembly 35.

An air induction system, indicated generally by the reference numeral 46, collects an air supply and delivers it to the combustion chambers 36 through these intake passages 44. This induction system 46 will be described shortly.

The intake valves 42 are urged to their closed positions by means of coil compression springs 47 that cooperate with keeper, retainer assemblies 48. Thimble-type tappets 49 are slidably supported in the cylinder head assembly 35 and cooperate with the valves 42 for effecting their opening. An intake camshaft 51 is rotatably journaled in the cylinder head assembly 35 in a known manner and has individual valve lobes that cooperate with the tappets 49 for effecting the opening of the valves 42, as is well known in this art. The intake camshaft 51 is driven at one-half crankshaft speed through any suitable timing mechanism.

Figure 2:
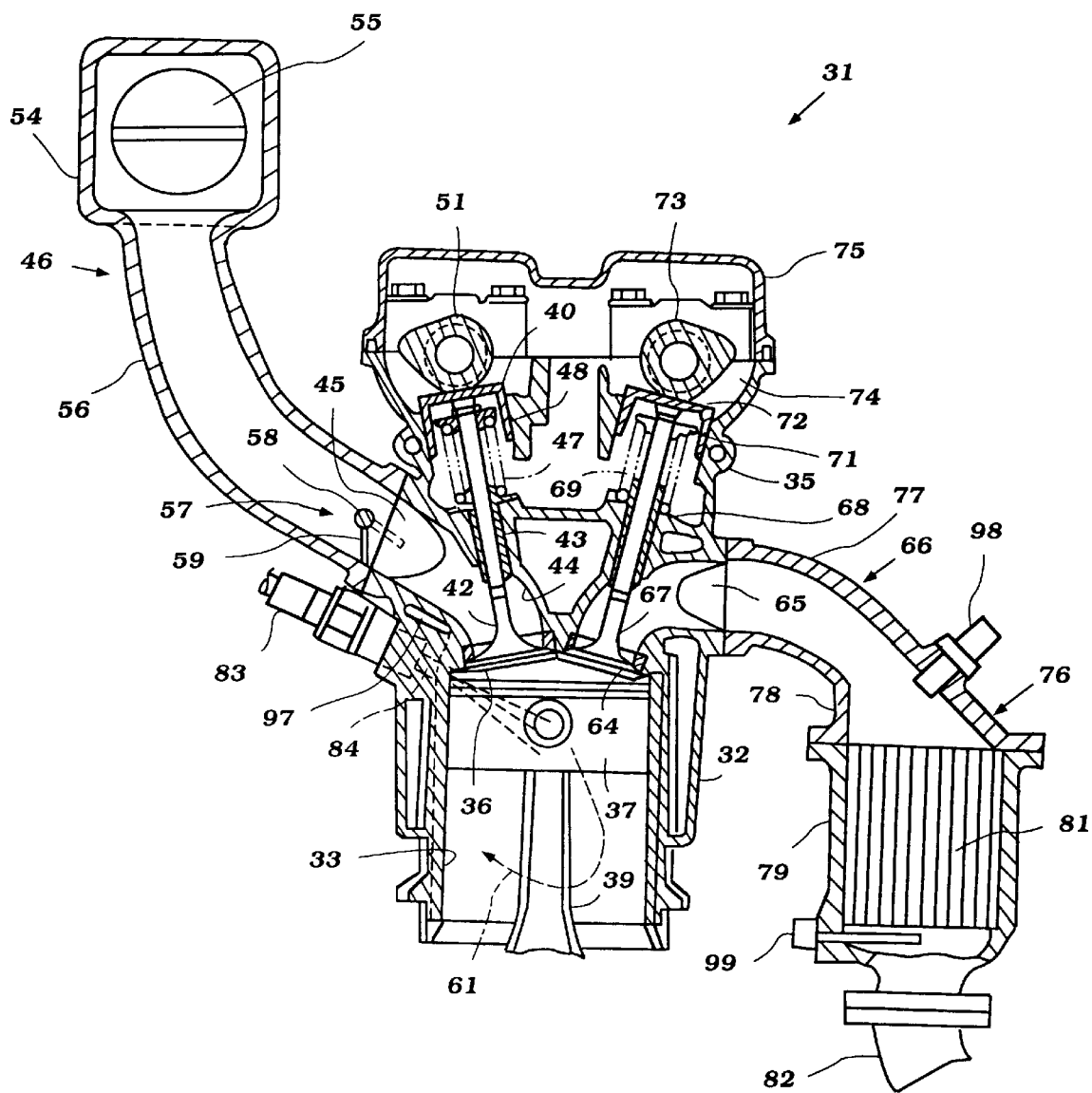
FIG. 2 is a partial cross-sectional view, taken through one of the cylinders of the engine.

Referring now primarily to FIGS. 1 and 2, the induction system 46 includes an air inlet device including a filter element, indicated schematically at 52, and which draws atmospheric air through a suitable air inlet opening. It should be noted that the engine 31 is primarily designed for operation and powering a motor vehicle. In such an application, the air inlet device and air filter 52 will draw air from within the engine compartment of the vehicle. This is merely a typical environment in which the engine 31 and the invention may be utilized. Those skilled in the art will readily understand other potential applications for the utilization of the invention. However, the invention does have particular utility in engine applications wherein the engine 31 is called upon to operate over a wide variety of speed and load conditions.

The air filter and inlet device 52 supply air through a throttle body 53 to a plenum chamber 54 of a manifold assembly. The throttle body 53 has within it a throttle valve 55 that is controlled by a suitable remote operator in a known manner. This throttle valve 56 provides a single throttle control for all cylinders of the engine. The plenum chamber 54 supplies air, as is noted, through a plurality of manifold runners 56 to the cylinder head intake passages 45.

A tumble valve assembly, indicated generally by the reference numeral 57, is positioned in the area where the runners 56 merge to the cylinder head intake passage inlet openings 45. This tumble valve assembly 57 includes a control valve shaft 58 on which a number of tumble valves 59 are affixed. In the position illustrated in solid lines in FIG. 2, these tumble valves 59 obstruct the side of the intake passages 44 toward the outer peripheral edge of the cylinder bores 33 so that the charge entering the combustion chambers is directed across the center plane of the cylinder bores 33 toward the opposite side of the cylinder bore so as to cause the air flowing into the combustion chamber to follow a pattern, indicated by the arrow 61 in FIG. 2. This creates what is referred to as a "tumble" in the combustion chambers 36.

This tumble passes across the cylinder bores downwardly, strikes the head of the piston 37 and then moves upwardly so as to swirl about a horizontally disposed axis. This type of motion is accelerated as the pistons 37 move to their top dead center position, so as to generate good turbulence in the combustion chamber. This results in more rapid flame propagation under low-speed and low-load conditions and thus can significantly improve combustion. A servo motor 62 is affixed to one end of the control valve shaft 58 and is actuated by an ECU 63.

In addition to controlling the tumble valve mechanism 57, the ECU 63 controls other portions of the engine, including the fuel supply and ignition, in accordance with the invention, in a manner which will be described. For this purpose, the ECU 63 receives a number of signals of engine running and ambient conditions, as also will be described.

On the side of the cylinder head opposite to the intake passages 44, there are provided a plurality of exhaust passages 64. Like the intake passages 44, the exhaust passages 64 are Siamesed, and terminate in common discharge ends 65 formed on the side of the cylinder head 35 opposite to the intake passage openings 45. These exhaust passage openings 65 communicate with an exhaust system 66 which will be described in more detail shortly.

The cylinder head 35 also mounts a plurality of poppet type exhaust valves 67 by means that include exhaust valve guides 68. Coil compression springs 69 cooperate with keeper retainer assembly 71 for urging the exhaust valves 67 to their closed positions.

Thimble-type tappets 72 are slidably supported in the cylinder head assembly 35 and cooperate with the exhaust valves 67 for opening them. An exhaust camshaft 73 is rotatably journaled in the cylinder head assembly 35 and cooperates with the thimble tappets 72 for operating the exhaust valves 67. Like the intake camshaft 51, the exhaust camshaft 73 is driven at one-half crankshaft speed, by any suitable type of drive mechanism.

The valve actuating mechanism is located within a cam chamber 74 formed in the upper end of the cylinder head. This cam chamber is closed by a cam cover 75 that is affixed to the cylinder head assembly 73, in a known manner.

Referring now primarily to FIGS. 1 and 2, the exhaust system 66 includes an exhaust manifold, indicated generally by the reference numeral 76, and which includes a plurality of exhaust manifold runners 77 that extend from the individual cylinder head exhaust passage openings 65. These exhaust manifold runners 77 merge in a collector section 78 which, in turn, communicates with the upstream side of a catalytic converter 79. The catalytic converter 79 holds a catalyst bed 81 through which the exhaust gases must pass before being discharged to the atmosphere through an exhaust pipe 82. A suitable muffler and other silencing devices may be interposed in the exhaust pipe 82 for exhaust silencing, as is also well known in this art.

A fuel charge is delivered to the combustion chamber 36 by a charge former or fuel charging system in the form of a direct cylinder fuel injector, indicated generally by the reference numeral 83. The fuel injector 83 has its nozzle portion 84 mounted in a discharge port 85 formed in the cylinder head assembly 35 on the intake side of the engine.

The port 85 is located between the intake valves 42, so as to spray generally centrally into the combustion chamber recess 36 from one side thereof.

Figure 3:
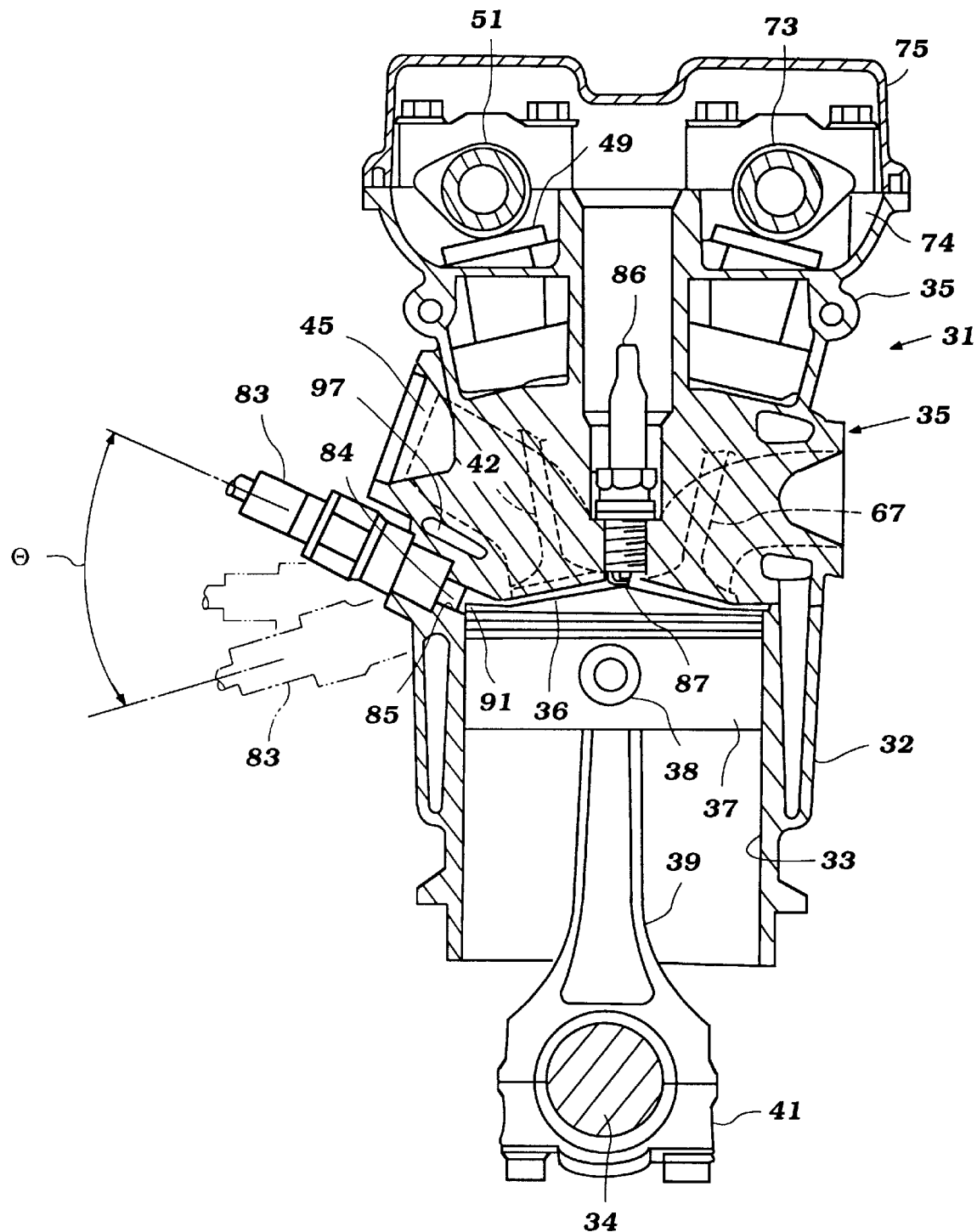
FIG. 3 is an enlarged cross-sectional view, taken along a plane offset from the plane of FIG. 2 and through the same cylinder.

Preferably, the fuel injectors 83 are mounted so that their angle to the axis of the cylinder bore falls in the range shown in FIG. 3 as the angle θ. This angle is a relatively small angle, such as 30°–40°. The preferred position is shown in solid lines in FIG. 3, but optional positions are shown in the phantom lines. The angle will be chosen so as to determine what proportion of the charge is directed downwardly toward the head of the piston 37, for a reason which will be described, and what portion is delivered more upwardly into the combustion chamber.

The fuel injectors 83 are supplied with fuel from a suitable source through a fuel rail (not shown). Preferably, the injectors 83 are electronically operated and controlled by the ECU 63, in accordance with a strategy which will be described. The fuel supply is such that the pressure of fuel discharge is approximately 100 kilograms per square centimeter (100 kg/cm$^2$). This is to control the degree of penetration of the charge into the combustion chamber.

Spark plugs 86 are mounted centrally in the cylinder head assembly 35 so that their spark gaps 87 extend generally centrally into the combustion chamber recess 36. The spark plugs 86 are fired by a suitable ignition system under the control of the ECU 63. Although the ignition system, per se, may be of any conventional type, in accordance with a feature of the invention, the ECU 63 employs a control strategy which cooperates to assist in the anti-knock prevention for the engine 31, while maintaining maximum or near maximum power outputs.

Figure 4:
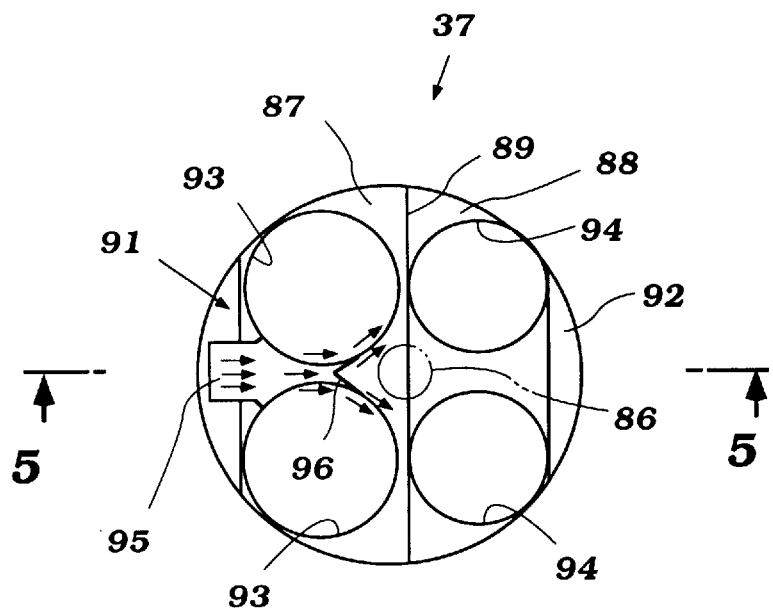
FIG. 4 is a top plan view showing the piston head of this embodiment, and the relation of the fuel spray into the combustion chamber and against the piston head.
Figure 5:
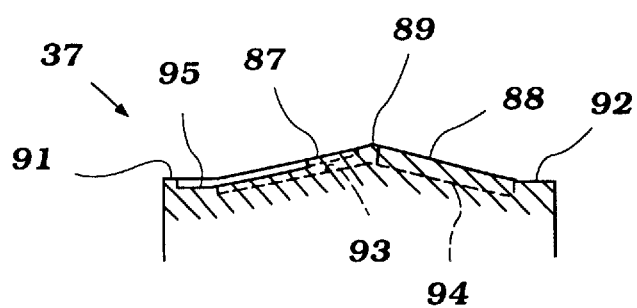
FIG. 5 is a cross-sectional view taken along the line 5—5 of FIG. 4.

The configuration of the combustion chamber and specifically that portion provided by the head of the piston 37, will now be described by primary reference to FIGS. 4 and 5. It should be seen that the piston 37 is formed with a generally dome shape, formed by a pair of angularly upwardly inclined portions 87 and 88 that merge at a line 89 which extends generally longitudinally of the engine in a direction parallel to the axis of rotation of the crankshaft 34. This line 89 generally intersects the cylinder bore axis and also the area where the spark gap 87 of the spark plug is provided.

A pair of relatively small squish areas 91 and 92 are formed at the peripheral edges of the piston 37 on the intake and exhaust sides, respectively.

The inclined piston head surfaces 87 and 88 are formed with generally circular recesses 93 and 94, respectively, that provide clearance for the heads of the intake and exhaust valves 42 and 67. The intake valve recesses 93 are formed as a part of a recessed channel that is formed by an entry portion 95 that is formed in the squish area 91. This entry portion 95 receives the fuel when the piston 37 is at its top dead center, if injection is occurring at this time.

It will be seen from FIG. 3 that under this condition, the squish area 91 partially obstructs the channel 85 in which the injector nozzle 84 is positioned. Hence, fuel that is sprayed into this area at this time will flow, as shown by the arrows in FIG. 4, toward a dividing projection 96 that is formed in this recess so as to divide the fuel spray and direct it around the sides of the spark gap 87. This will tend to ensure that there will be a stoichiometric charge present at the gap of the spark plug 87 at the time when it is fired, without undue wetting of the spark plug 86.

Any fuel which impinges on the head of the piston 37 will rapidly evaporate due to the heat which is accumulated in the piston head. This further aids in fuel distribution in the combustion chamber 36, and because of the somewhat stratified effect, it is possible to operate the mixture on a lean burn cycle to reduce hydrocarbon emissions. The spray pattern and spray timing also will assist in this effect, as will be described.

The engine 31 is, in the illustrated embodiment, of the water-cooled type, and for this reason, the cylinder block and cylinder head assembly are formed with cooling jackets 97, through which liquid coolant is circulated, by any known type of circulating system.

The control strategy for the engine 31, and specifically the fuel control, is of the feedback type. Therefore, an oxygen ($O_2$) sensor 98 is mounted in the exhaust manifold 76, close to the exhaust port opening 65. A signal, indicated by the character "a", is transmitted from the oxygen sensor 98 to the ECU 63, for assisting in engine control. In addition, a number of other sensors are employed, and these include an exhaust system temperature sensor 99 that is mounted in the exhaust system downstream of the catalyst bed 81, and outputs a signal, indicated by the reference character "b", to the ECU 63, so as to provide protection against overheating. In addition, this temperature sensor 99 may be utilized to determine when the catalyst in the catalyst bed 81 is at its operating temperature, so as to initiate feedback control.

The system also employs an EGR system, indicated generally by the reference numeral 101. The EGR system, as is known, is designed so as to reduce nitrous oxide ($NO_x$) emissions. This system includes an EGR valve 102 that receives exhaust gases from the exhaust manifold 76 through an EGR pipe 103. These exhaust gases are then selectively delivered to the combustion chambers through an EGR passage 104, controlled by the EGR valve 102, and into the throttle body 53 downstream of the throttle valve 55.

Various engine conditions are also supplied to the ECU 63 for its operation. These include a load sensor, such as a throttle position sensor 105, that outputs a signal c indicative of the angular position of the throttle valve 55 and, accordingly, of operator demand. Also, there may be provided an intake manifold vacuum sensor 106 that outputs a signal d indicative of the intake manifold vacuum and another indication of load on the engine.

The engine temperature is sensed by an engine temperature sensor 107 that is mounted in the cylinder head or cylinder block, in proximity to one of the cooling jackets 97. This outputs an engine temperature signal e to the ECU 63.

In addition, there is provided a knock sensor 108 which is mounted in the cylinder head assembly 35 and which outputs a signal indicative of vibrations in the engine which may indicate a knocking condition. This signal is indicated by the reference character "f". In addition to these signals, various other engine running and/or ambient conditions are supplied to the ECU 63. These also include a sensor that senses the rotational angle of the crankshaft 34 and may provide a speed signal g, or this signal g may come from a separate speed sensor may be employed.

As has been noted, the ECU 63 outputs controls for controlling both the fuel injectors 83, timing of firing of the spark plugs 86, and other engine controls.

The basic feedback control strategy may be of any known type. Superimposed upon this, however, is a system for controlling the peak pressure in the combustion chambers 36 and specifically to prevent knocking therein, without significantly reducing the engine performance. As has been previously noted conventional prior art systems for providing knock control tend to control knock by retarding spark timing and/or controlling fuel supply amount in such a manner that the actual power of the engine is decreased. In accordance with this invention, as will become apparent, the knocking is controlled without such a large sacrifice in engine performance.

This is done by injecting the fuel from the fuel injectors 83 in two segments, at least under some running conditions, so as to limit the peak pressure that will occur in the combustion chamber and thus reduce the likelihood of knocking at the early stage of combustion. A second amount of fuel is supplied later in the burning process, so as to elevate the pressure in the combustion chamber at this later time. However, this elevated pressure is still less than the maximum pressure and definitely less than the pressure under which knocking will occur.

Although the invention is directed primarily toward the control routine for minimizing or preventing knocking conditions, it should be readily apparent to those skilled in the art that this control routine may also be employed for other conditions wherein it is desired to control and shape more accurately the pressure curve that occurs within the combustion chamber during the compression and primarily the expansion strokes. Basically, however, the control routine is designed so as to primarily provide pressure control.

Figure 6:
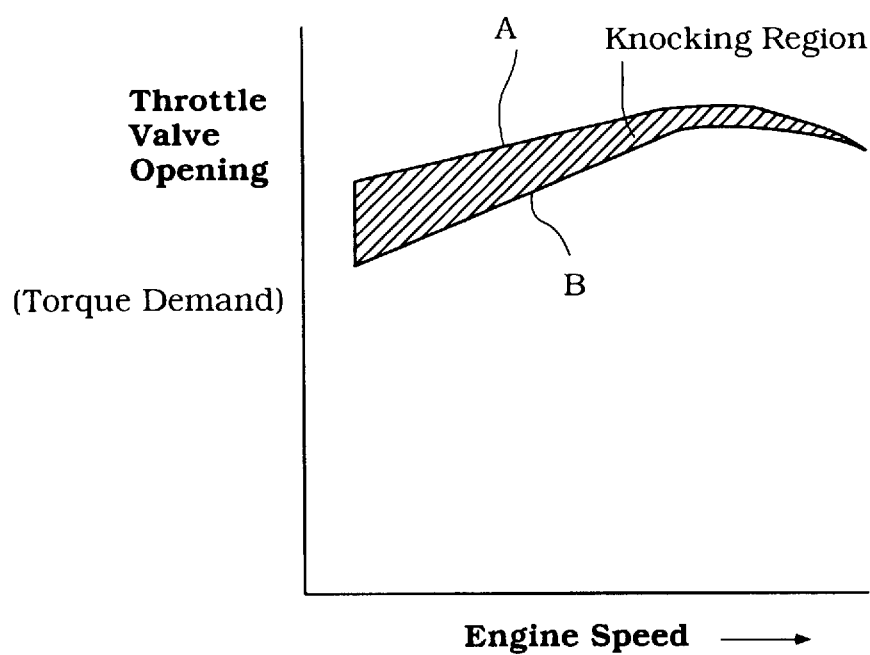
FIG. 6 is a torque, load curve showing the control range of the engine.

The control area may be seen in FIG. 6, wherein the line or curve B indicates the area below the knocking region (indicated by the shaded area) and below the curve A, which represents a full throttle opening under various load conditions, and represents maximum operator demand.

Basically, the knocking is controlled in the knocking region between the curves A and B by injecting the fuel from the injectors 83 into segments. The first segment, and that which represents the larger amount of fuel, begins sometime before combustion occurs, i.e., before the firing of the spark plugs 86. This constitutes the major amount of fuel supply for the engine. However, a later amount of fuel is injected by the injectors 83 in a second segment, this occurring later in the expansion cycle. As will become apparent, this is done to reduce peak pressure in the combustion chamber without significantly reducing the engine power output. Under normal routines other than wherein the two segment of fuel supply is employed only for preventing knocking, all of the fuel is injected by the injectors 83 in the area below the curve B in a single segment.

Figure 7:
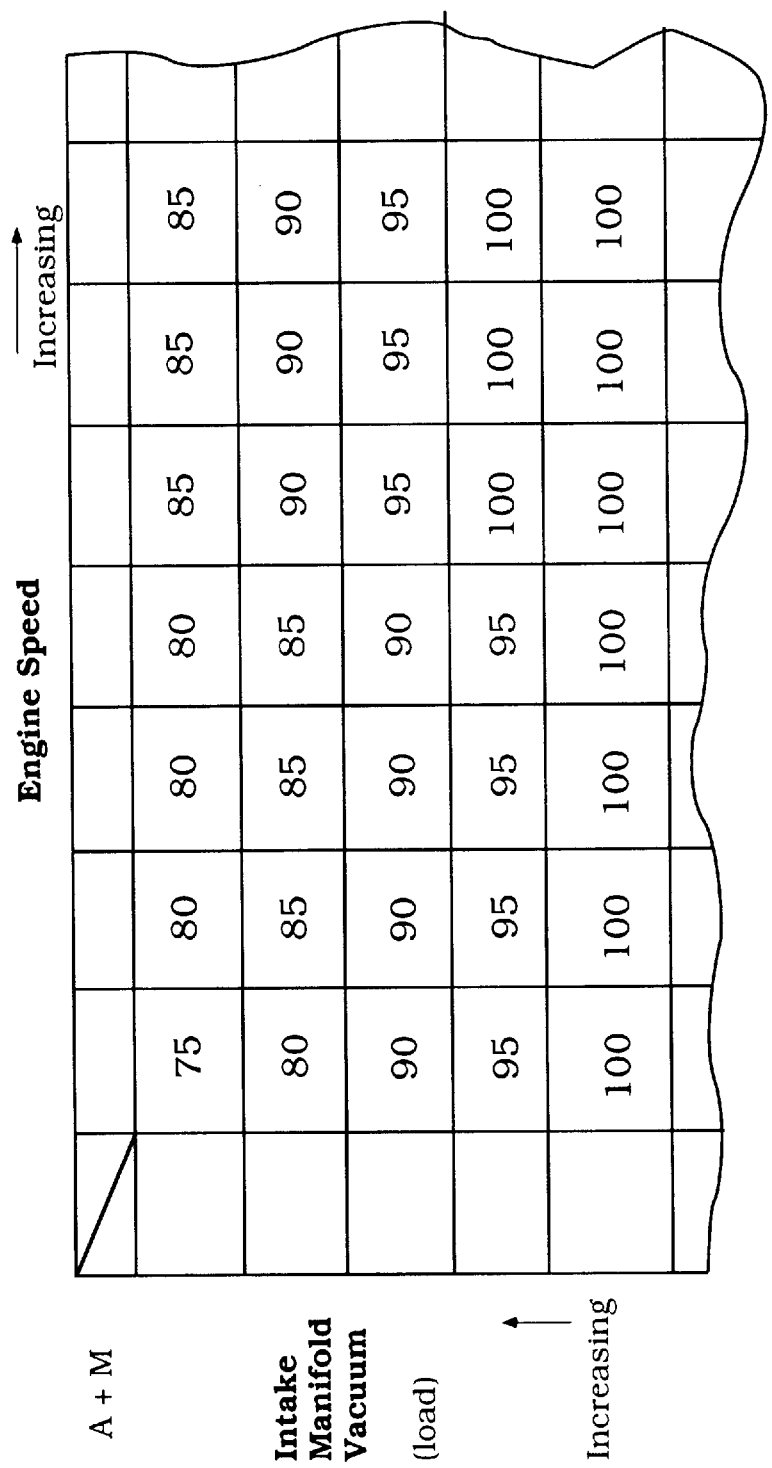
FIG. 7 is a graphical view showing a look-up map of the type utilized to determine the percentage of the total fuel introduction introduced during the initial segment of fuel supply.

When the two phase or two segment fuel injection routine is followed, the amount of fuel injected by the injector 83 in the first segment is determined from a lookup map of the type shown in FIG. 7. This map shows the ratio of fuel that is injected in the first segment relative to the total amount of fuel supplied. In other words, the map of FIG. 7 is a map of ratios, not of actual fuel injection amount. The total amount of fuel injection is determined in a slightly different manner. As may be seen, when the engine speed increases and/or the engine load increases, the likelihood of operating in the shaded range of FIG. 6 increases and the fuel is injected in the two segments.

Figure 8:
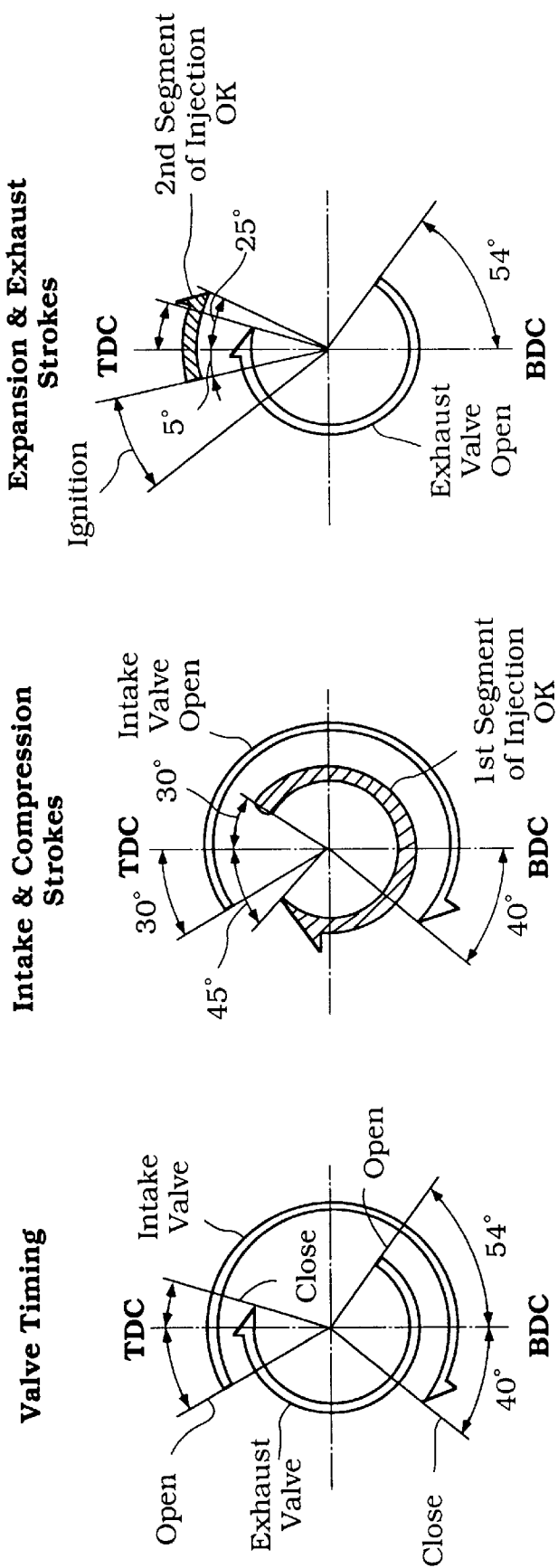
FIG. 8 is a three-part view showing (1) in View A, the timing of events of the opening and closing of the intake exhaust valves; (2) in View B, the intake and compression cycle; and (3) in View C, the expansion exhaust cycle; and indicating in these views the steps of fuel injection.

FIG. 8 is a timing diagram showing the valve timing, the intake and compression process, and the expansion and exhaust process during successive revolutions. Also, the right-hand two views of this figure (b and c) indicate when the first and second segments of fuel injection are permissible within the desired control range.

As may be seen in view a, the intake valves 42 begin to open at approximately 30° before top-dead center and continues to be maintained in an open condition until approximately 40° after bottom-dead center. This valve timing is chosen so as to provide relatively high maximum output.

This is possible because of the knock control and compression pressure control that is employed with the invention.

At the completion of the closing of the intake valve at 40° after bottom-dead center, none of the valves are opened until reaching approximately 54° before bottom-dead center on the expansion stroke. At this time, the exhaust valve opens and it is maintained open until approximately 16° after top-dead center at which time it closes.

During this phase and beginning at about 30° before top-dead center, both the intake and exhaust valves are open and this overlap continues until 16° after top-dead center when the exhaust valve closes.

In accordance with the invention, the first segment of fuel injection can be begun at any time within the range of 30° after top-dead center during the intake stroke and continuing on up until about 45° before reaching top-dead center on the compression stroke. This injection timing is chosen so that fuel injection will not begin until after the exhaust valves 67 are closed. Because of the fact that there is direct injection and the fuel injectors 83 are mounted so that they spray generally toward the exhaust side of the engine, it is desirable to ensure that the fuel injection does not occur when the exhaust valves are open. This is to avoid the loss of any unburned fuel through the exhaust system at this time. This obviously would increase hydrocarbon emissions.

Injection of the first segment is terminated no later than 45° before top-dead center. This is done so as to ensure that no portion of the first segment of fuel injection will occur once combustion has started. This would increase the likelihood of knocking and could present possible problems.

As seen in view c, the second segment of fuel injection can begin some time before top-dead center (in the range of about 5° before top-dead center) and continuing on through approximately 25° after top-dead center. Thus, the second segment of fuel injection begins after ignition has occurred and combustion has begun. This injection timing is timed to occur something in the order of 30° before top-dead center under high-speed/high-load conditions.

Figure 9:
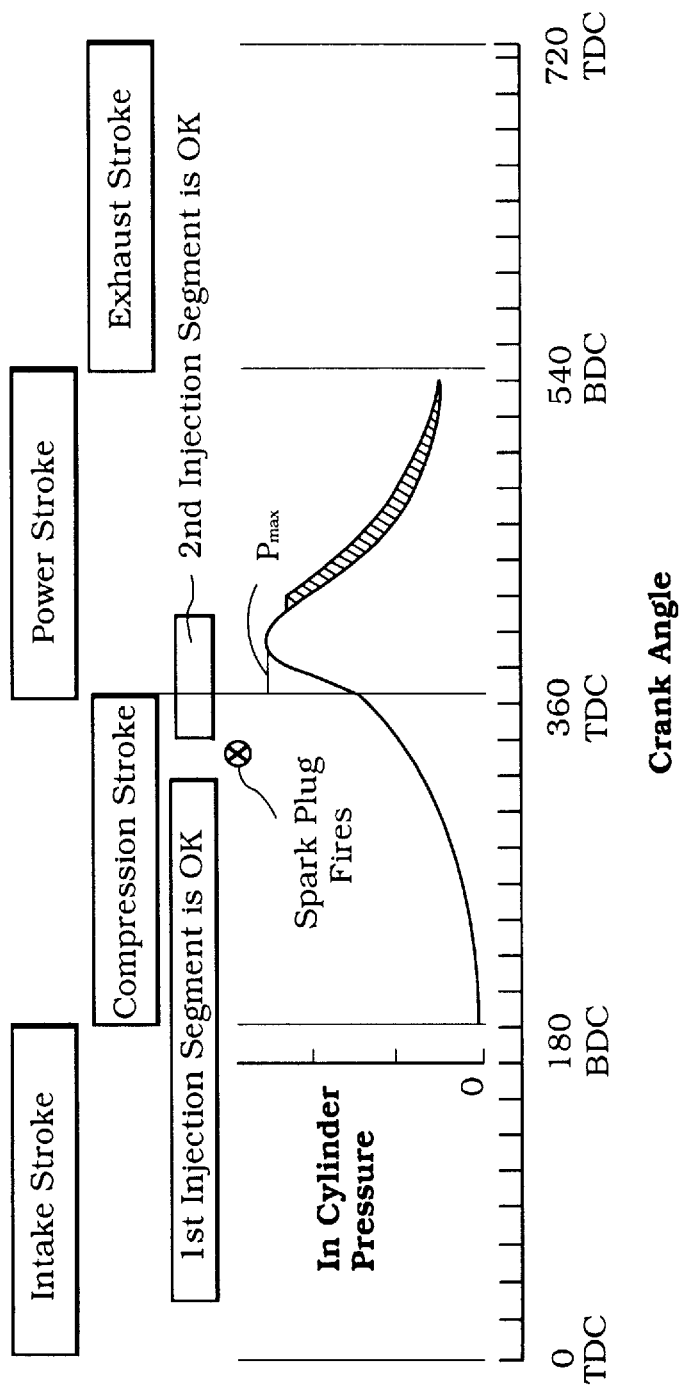
FIG. 9 is a graphical view showing the pressure in the combustion chamber during a cycle of operation and the various phases of the cycle, the injection steps and the ignition.

FIG. 9 is a graphical view showing the timing diagrams of FIG. 8 but in a linear fashion so as to more easily understand the actual condition. As may be seen in this figure, the fuel injection from the first segment can occur anytime during the intake cycle after the intake valve has opened and before the spark plug has fired. This occurs when the pressure is increasing in the combustion chamber only because of the compression. When the spark plug fires, combustion will begin and the pressure build up will accelerate as a result and builds up more rapidly to a peak indicated at $P_{max}$ which occurs some time after top-dead center and then falls off.

During this time, the second injection segment can occur. This second fuel injection segment will not begin to burn until some time after the $P_{max}$ point even though it is injection may start slightly earlier. The second segment of fuel will not begin to burn immediately as seen. Thus the delayed combustion of this added fuel will cause the pressure curve to become higher toward the end of this stroke as shown by the shaded line in this figure. This has the effect of reducing the maximum pressure in the combustion chamber without significantly reducing the total work output of the engine.

Figure 10:
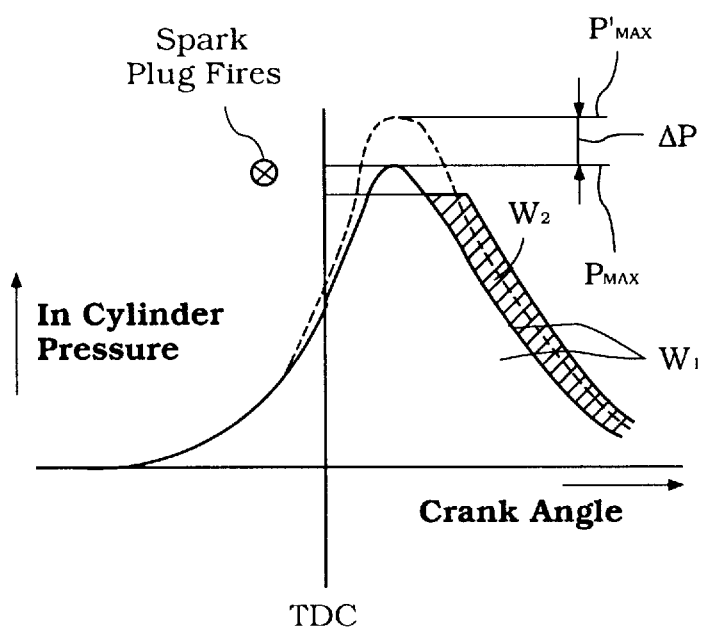
FIG. 10 is a pressure trace in the combustion chamber, both showing the normal pressure trace in broken lines and the pressure traces in accordance with an embodiment of the invention in solid lines.

FIG. 10 depicts how the maximum pressure $P_{max}$ in the cylinder can be reduced from the $P'_{max}$ value which would exist if all fuel required to achieve the desired output were injected in a single segment and the reduced maximum pressure $P_{max}$ that exists when the two-segment injection occurs. This has the effect of reducing the maximum pressure by the amount $\Delta P$.

However, the maximum work output is not as significantly reduced and may in fact be maintained close to the same as would occur if the higher pressure existed. As may be seen, the shaded area of the pressure curve represents the increased pressure that occurs during the working or power stroke due to the added fuel which does not begin to burn until after the maximum pressure is reached. As a result, the work output $W_1$ (the area under the pressure time curve can be held close to or even the same as the work $W_2$ that would occur when the higher pressure and knocking condition potential can occur.

Figure 11:
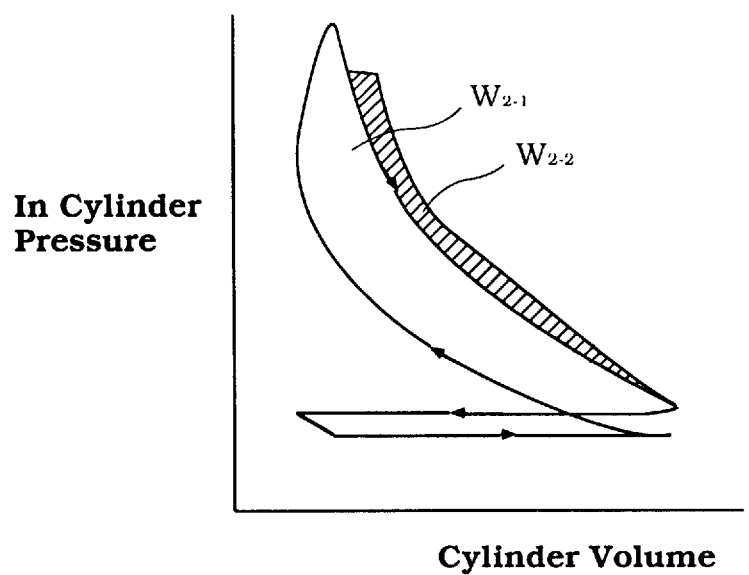
FIG. 11 is a pressure indicator diagram showing the work performed in the cylinder in accordance with an embodi

FIG. 11 is an indicator diagram which also reveals the same results. As may be seen again, the actual work $W_2$ is made up of two segments $W_{2-1}$, which is the result of the energy obtained from burning the first segment of fuel plus $W_{2-2}$ which represents the additional work created by the burning of the secondary fuel injection amount in the combustion chamber.

Figure 12:
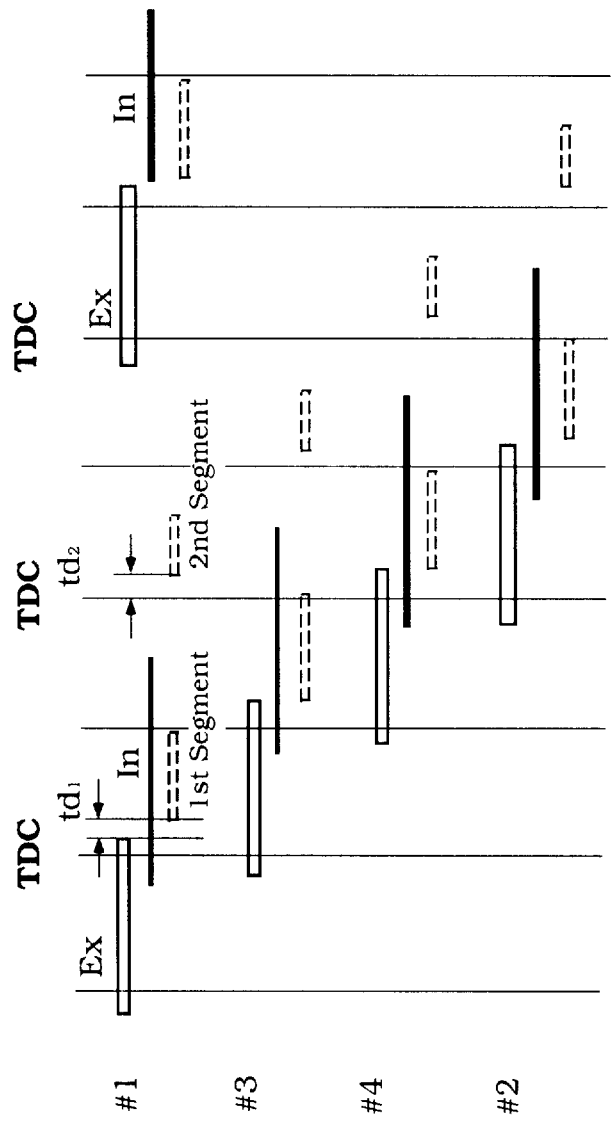
- FIG. 12 is a graphical view showing the fuel injection timing in accordance with one of the control methodologies.

The amount of fuel injected in each of the two segments can be varied as can the actual timing of the two injections. FIG. 12 shows the injection amounts for each cylinder during a cycle of operation employing a preferred timing arrangement wherein the timing of fuel injection for the first segment does not begin until a time td1 after the closing of the exhaust valve. This is done so as to ensure against the loss of fuel out of the exhaust valve, as aforenoted. The second segment of fuel injection is begun at a time delay td2 after top-dead center during the combustion or expansion cycle.

Figure 13:
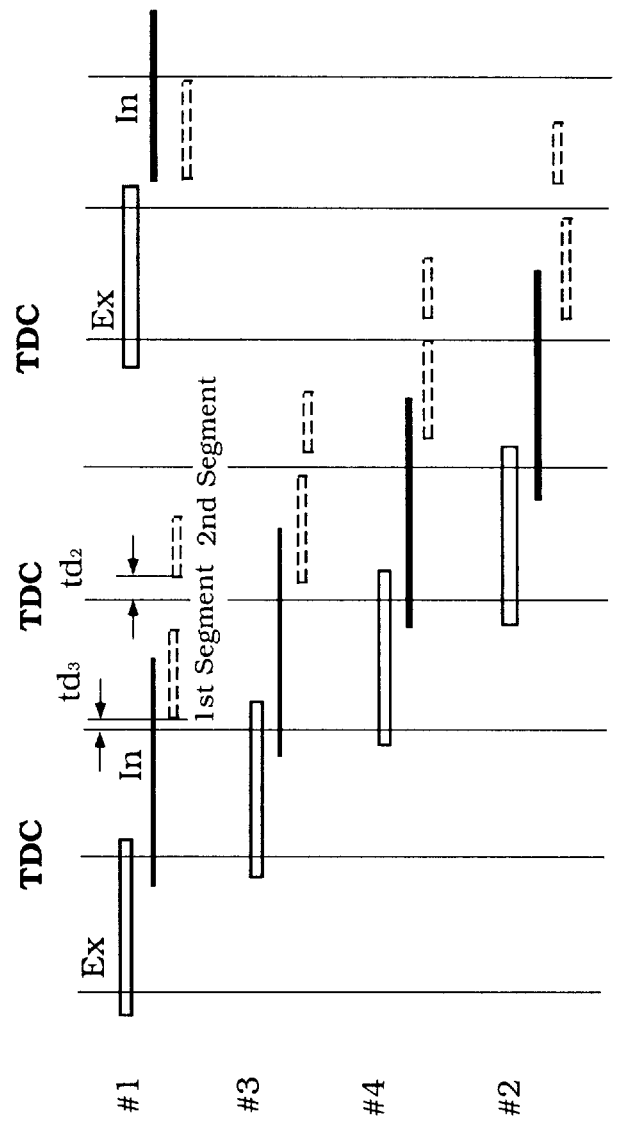
FIG. 13 is a graphical view, in part similar to FIG. 12, and shows another embodiment of fuel injection control.

Some other variations in these two segments of timing are also possible. For example, and as shown in FIG. 13, the first segment of fuel injection may be deferred until a time delay td3 after the piston has reached bottom-dead center on the intake stroke and at the beginning of the compression cycle. This timing can be utilized when the total amount of fuel to be injected is less because of the reduced engine speed or load but when still operating in a condition when knocking is likely to occur. The timing of beginning td2 of the second fuel injection segment can be as before.

In other words, the amount of fuel injected on the first segment can be reduced and its initiation delayed under conditions when the engine speed load is decreased. This also may be done when the engine speed is decreased because under these conditions the total amount of fuel required is less. By delaying the timing of injection it is possible to further ensure that a stoichiometric charge will be in the vicinity of the spark plug at the time it is fired. This is important particularly when operating in the low-speed/low-load conditions wherein the total amount of fuel to be supplied is small. This permits lean burn running because there will be stratification as aforenoted and a stoichiometric charge will be present at the gap of the spark plug at the time that it is fired.

Figure 14:
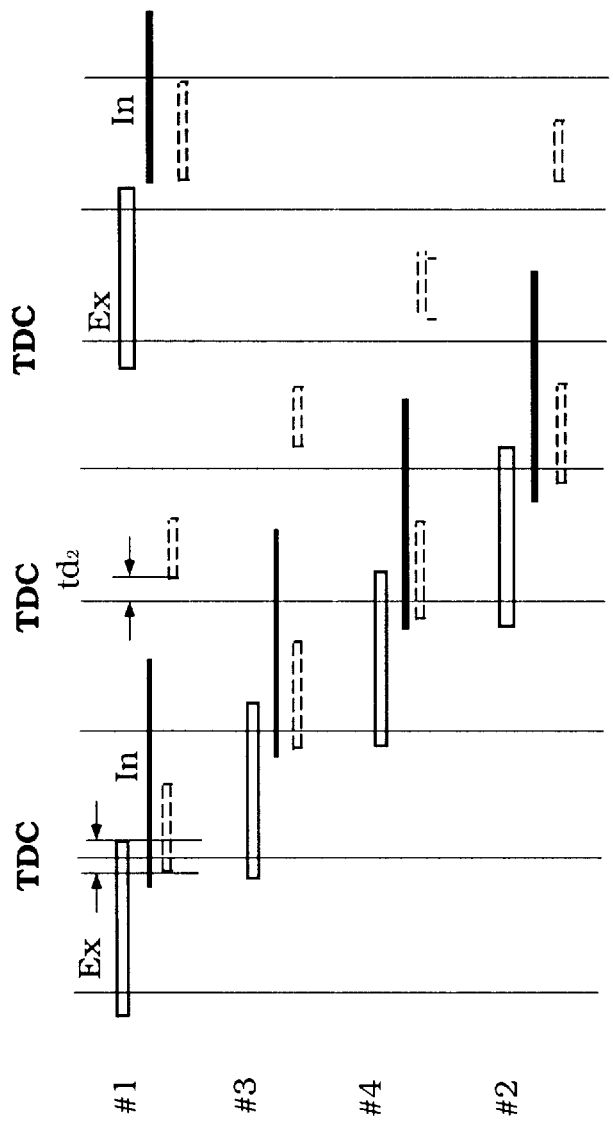
FIG. 14 is a graphical view, in part similar to FIGS. 12 and 13, and shows another embodiment of fuel injection control.

FIG. 14 is another timing diagram which shows yet another arrangement. In this arrangement, the timing of beginning of injection of the first segment of fuel is advanced to a time when there is in fact overlap between the opening of the intake valve and the closing of the exhaust valve. This type of arrangement can be utilized when the engine is provided with a turbocharger. This will cause some fuel to be discharged through the exhaust system but will effect a somewhat cooling effect on the turbocharger so as to somewhat reduce the boost pressure and further assist in avoiding knocking condition.

As may be seen in FIG. 14, the first segment of fuel injection occurs during the overlap period. This is, however, some time after the beginning of the overlap so as to somewhat reduce the total amount of fuel that will pass into the exhaust system.

Although a wide variety of variations in control strategies may be employed to practice this invention, for knock control or to control the maximum pressure, the second segment of fuel injection is not begun until a time when this fuel will not begin to burn until after peak pressure has occurred in the combustion chamber. In addition, in substantially all instances, the amount of fuel injected in the second segment is substantially less than the first segment supply. The ratio between the first and second injection amounts will depend upon engine speed and engine load as shown by, for example, the map in FIG. 7. Basically, the total volume of fuel supplied in the first segment decreases as the engine load increases and the volume of the second step decreases as the engine speed increases.

The amounts of fuel supplied during the two segments are determined by maps which are pre-established so as to set the values so that knocking can be prevented. The change of supply of fuel in the steps can be either gradually decreased until knocking is eliminated or can be done in one full step. Also, the system operates so that if the fuel supply is decreased and knocking still occurs then the ignition timing can be retarded.

Also, if the engine temperature is low during initial warm up, then the ratio between the first and second fuel segments is altered so that lesser fuel is supplied during the second segment. This is done so as to improve warm up time. Also, in this condition the amount of ignition timing retardation is less than that under the hot operation cycle. The amounts of fuel supplied also can be determined by a feedback control routine with the split up being determined experimentally as noted.

Figure 15:
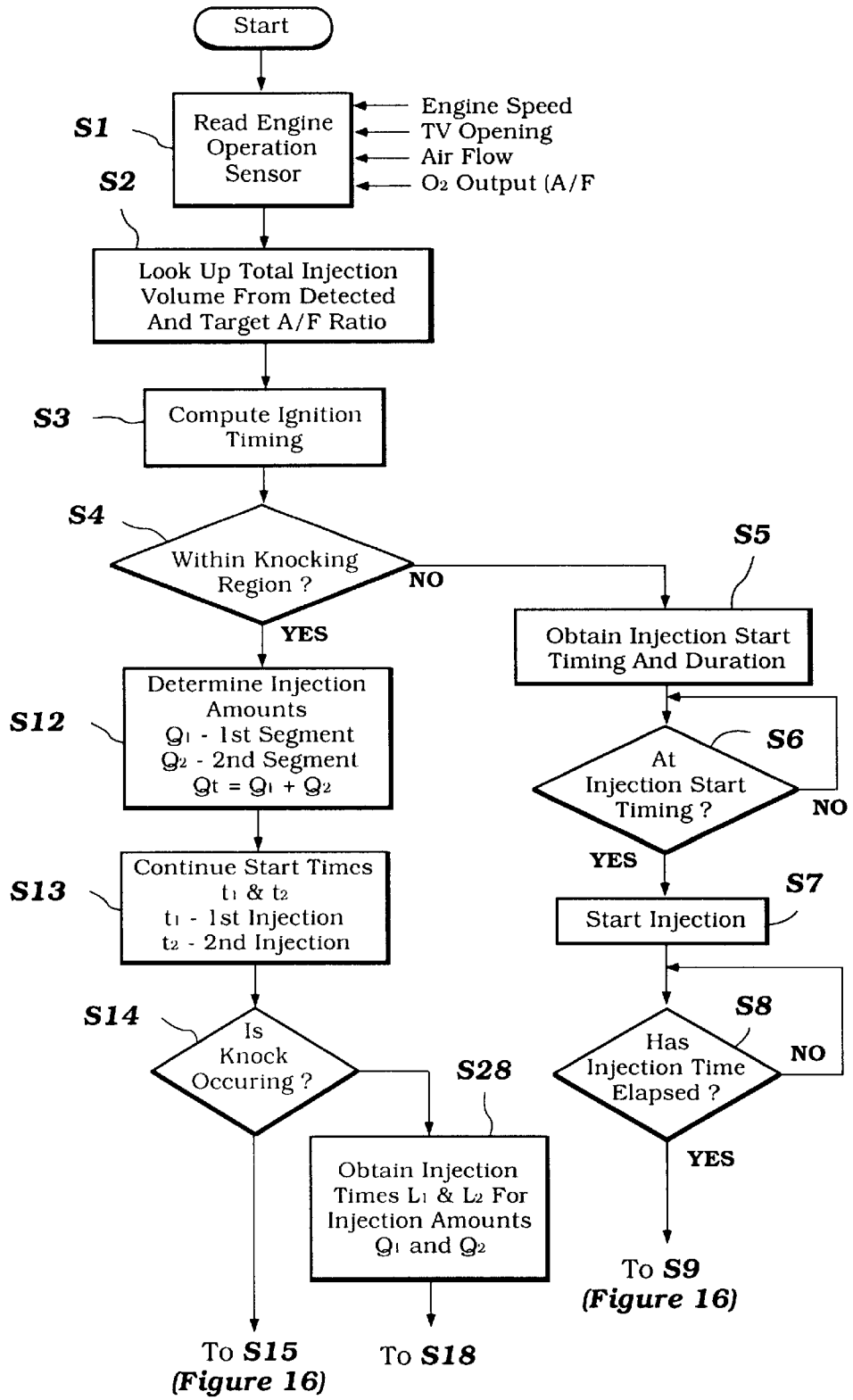
FIG. 15 is a block diagram showing a portion of the control routine.

The control routine for establishing the engine control in accordance with a preferred embodiment of the invention will now be described by reference to the control routine diagram shown in FIGS. 15–17 and beginning at FIG. 15. When the program starts it moves to the step S1 so as to read the engine operational sensor output. These include the output of the engine speed sensor determined from the crank angle position and time, the opening of the throttle valve 55 determined by the sensor 105, the airflow as determined by an appropriate airflow meter or the intake air pressure as determined by the sensor 106 and the output of the oxygen sensor 98.

The program then moves to the step S2 so as to look up the total injection volume required from the detected running conditions and a comparison of the deviation of the air/fuel ratio from the sensed air/fuel ratio of the oxygen sensor. This is done by using a basic injection amount and then an adjustment injection amount depending upon the deviation from the desired ratio.

The program then moves to the step S3 so as to compute or lookup from a lookup map from the running parameters the appropriate ignition timing.

The program then moves to the step S4 to determine if the engine is operating within a range where knocking is likely. This may be done either by determining if the conditions from a map such as that of FIGS. 6 or 7.

If the engine is not operating in the knocking range, the program moves to the normal control routine beginning at the step S5. At this step, a lookup map is employed to select the appropriate injection start timing and the duration of injection to supply the desired amount of fuel for the engine running condition.

The program then moves to the step S6 to determine if the crank angle of the crankshaft 34 from the output of the crank angle sensor is at the time when injection should begin. If it is not, the program repeats.

If, however, the crank angle is determined at the step s6 to be at the time when injection should begin, injection is started at the step S7. The program then moves to the step S8 to determine if the crank angle sensor output indicates that the crank is at the angle when injection timing should be stopped. If it is not, the program repeats.

Figure 16:
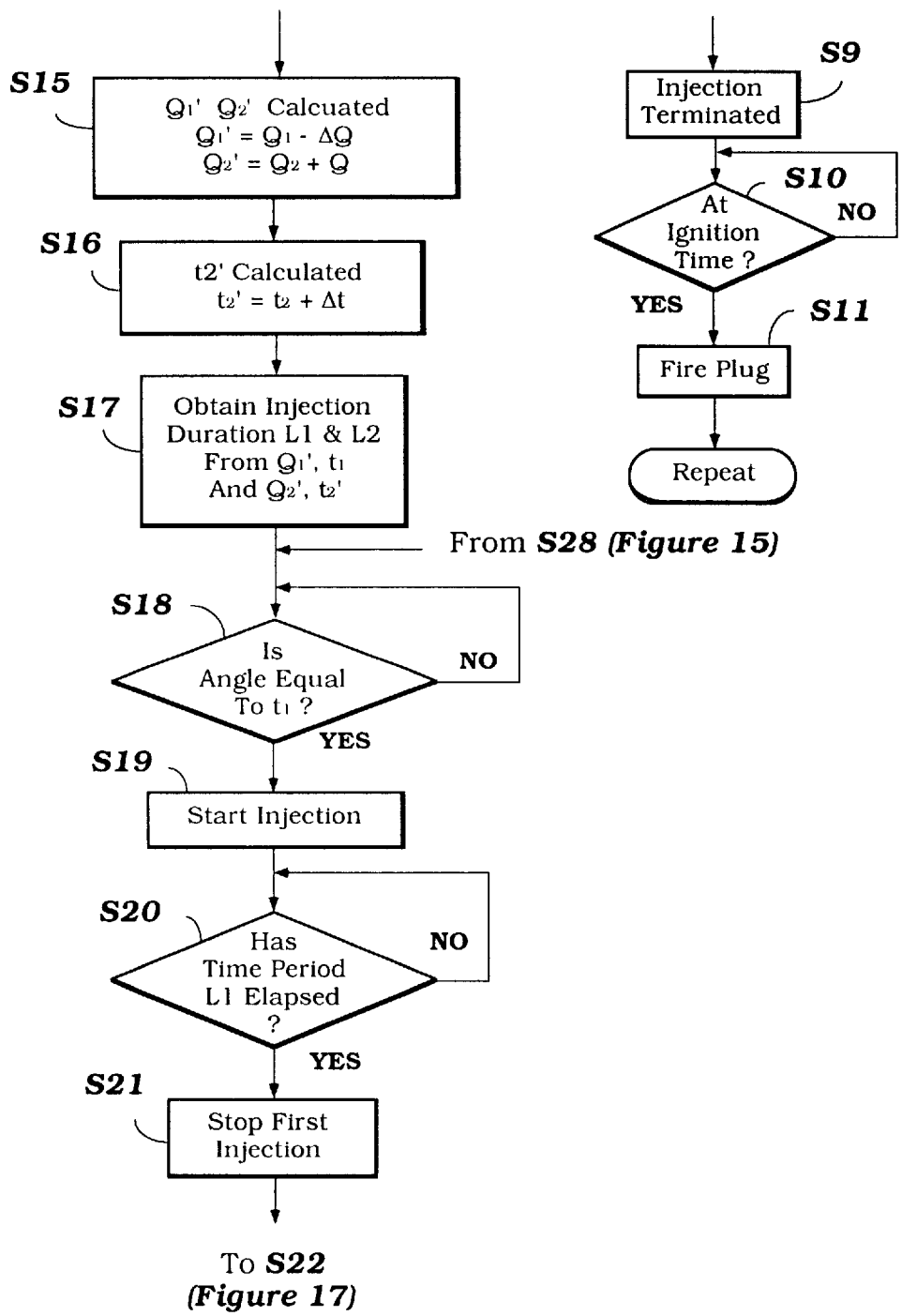
FIG. 16 is a block diagram showing yet another portion of the control routine.

If, however, as the step S8 it is determined that the injection during is completed, the program then moves to the step S9 as shown in FIG. 16 so as to terminate injection.

The program then moves to the step S10 to read the crank angle again and compare it to the crank angle when the spark timing should be initiated. If it is not, the program repeats. If, however, at the step S10 it has been determined that the crank angle is such that the plug should be fired, the ECU 63 outputs a signal at the step S11 to fire the plug. The program then repeats.

Referring now again to FIG. 15, if at the step S4 it is determined that the engine is operating within the knock region when knocking may occur, the program moves to the two-injection segment control routine beginning at the step S12.

At the step S12, the segments of fuel injection amounts are determined from a look up map such as the map of FIG. 7 so as to determine the ratios and/or the amounts of fuel for both the first and second segments Q1 and Q2, respectively. The total fuel supply amount QT is the sum of these two values (QT=Q1+Q2). This amount may be the same as the total amount calculated in the step S5 or may be somewhat less depending upon the aforenoted factors.

The program then moves to the step S13 to determine the beginning times for the two segments of injections ($t_1$ and $t_2$, respectively).

The program then moves to the step S14 so as to read the output from the knock sensor 108 and determine if knocking is actually occurring. If knocking is actually occurring as measured at the step S14, the program then moves to the step S15 shown in FIG. 16 so as to initiate steps to further control the peak pressure in the combustion chamber so as to stop the knocking which has occurred. As has been previously noted, this is done by reducing the amount of fuel that is supplied in the first segment and increasing the amount of fuel that is supplied in the second segment. Thus, at the step S15, the adjusted amounts of fuel supplied at the two segments Q1' and Q2' are calculated from the following formulas Q1'=Q1−ΔQ and Q2'=Q2+ΔQ. The amount ΔQ is the incremental step in reduction of the fuel supply of the first segment to shift the pressure curve as shown in the previously-described figures. This shifting may be done, as aforenoted, in one segment or in steps.

At the same time, there is created a delay at the step S16 in the start timing for the second injection period. In other words, the amount of fuel injected in the first segment Q1 is decreased and the start timing Q2 of the second injection segment is also retarded. Hence, t2' is calculated at the step Ss16. This is done by setting t2'=t2+ΔT with this adjustment also being determined by a lookup map. Again, this can be done in one step or plural steps.

The program then moves to the step S17 so as to obtain the injection time durations L1 and L2 for the new fuel injection amounts Q1' and Q2', these being the durations which will occur after t1 and t2'.

The program then moves to the step S18 so as to determine if the crank angle is such that the first injection timing t1 has been reached. If it has not, the program repeats. If it has, however, the program then moves to the step S19 so as to begin the first phase of fuel injection.

The program then moves to the step S20 to determine if the time period L1 for the first fuel injection amount has elapsed. If it has not, the program repeats. If, however, at the step S20 it is determined that the time period L1 has passed, then the program moves to the step S21 so as to terminate or complete the first injection segment.

Figure 17:
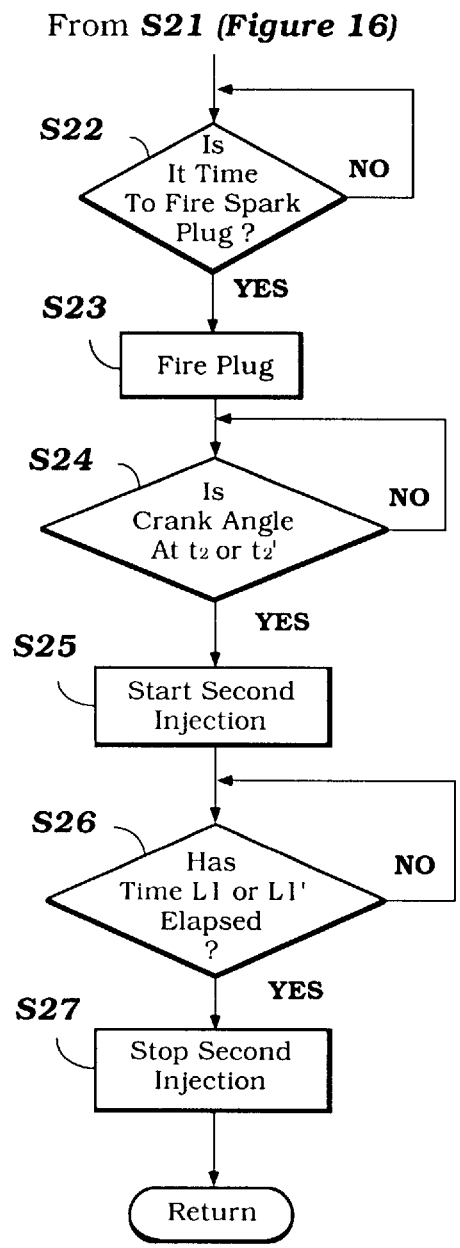
FIG. 17 is a block diagram showing a still further portion of the control routine.

The program then moves to the step S22 shown in FIG. 17. At the step S22 the crank angle sensor is again read to determine if the ignition timing for the firing of the spark plug, from the preset map has been reached. If it has not, the program repeats. If, however, at the step S22 the time for firing the spark plug has been reached, the spark plug is fired at the step S23 by the ECU 63.

The program then moves to the step S24 to determine if the second time period t2 or t2' has been reached so as to begin the second injection timing. If it has not, the program repeats. If it has, however, then at the step S25, the second fuel injection segment is begun.

The program then moves to the step S26 to determine if the time duration of the second injection L2 or L2' has passed. If it has not, the program repeats.

If, however, at the step S26 it has been determined that the time for discontinuance for the second injection is reached, the program moves to the step S27 so as to terminate the second injection timing and then the program returns.

Referring now again to FIG. 15, if at the step S14 it is determined that knocking is not occurring, the program moves to the step S28 so as to set the initial values L1 and L2 from the unadjusted amounts Q1 and Q2. When this is done, the program then immediately skips to the step S18 so as to set and control the timing and duration of the first and second fuel injection segments.

As has been previously noted, the program can also operate so as to change the ignition timing in the event the aforenoted control routine is not effective in precluding knocking. It should be readily apparent to those skilled in the art how these control routine steps can be inserted into the described control routine. The spark timing may be retarded in one or successive steps.

Figure 18:
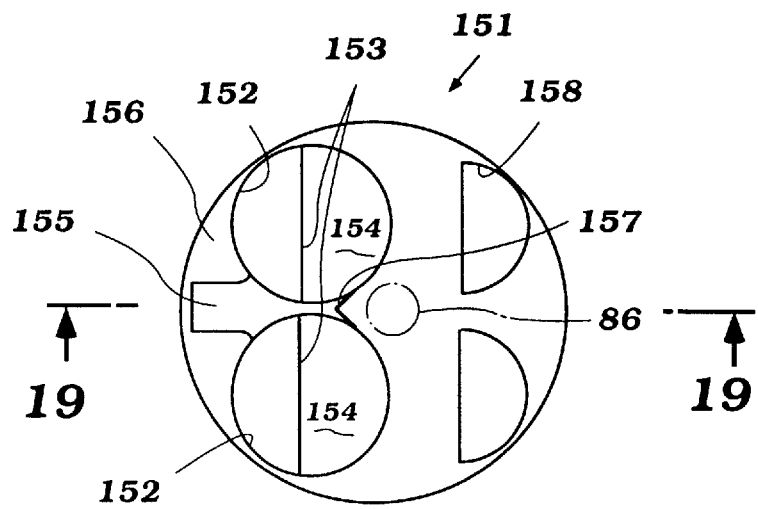
FIG. 18 is a top plan view of a piston, in part similar to FIG. 4, showing another embodiment of the invention.
Figure 19:
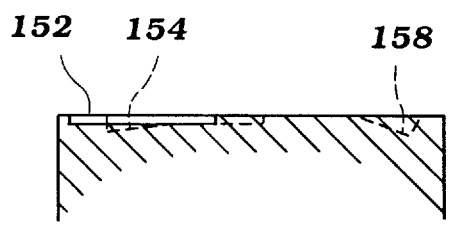
FIG. 19 is a cross-sectional view, taken along the line 19—19 of FIG. 18.

In the embodiment of the invention as thus far described, the pistons 37 have been provided with a domed head. FIGS. 18 and 19 show an alternate piston construction, indicated generally by the reference numeral 151, wherein a flat-headed piston is provided. In this arrangement, the piston 151 is nevertheless provided with recesses 152 for clearance of the intake valves. These recesses 152 are not planar but are inclined up to a point indicated by the line 153. From this point, there is provided a flat recess 154 which in essence provides a channel having an opening throat 155 in a squish area 156 that receives fuel sprayed from the fuel injector 83. A small dividing wall 157 is formed at the end of the recesses 154 and functions to direct the fuel away from the gap of the spark plug 86 while still maintaining a close relationship thereto so as to provide stratification.

The exhaust side of the piston 151 is provided with small clearance recesses 158 so as to clear the exhaust valves 67.

Thus, from the foregoing description it should be readily apparent that the described embodiments of the invention provide a very effective control for controlling the maximum pressure in a combustion chamber without substantially reducing the total engine performance. Thus, knock control can be achieved without deteriorating significantly engine performance. Of course, the foregoing description is that of preferred embodiments of the invention and various changes and modifications may be made without departing from the spirit and scope of the invention, as defined by the appended claims.

What is claimed is:

1. A fuel supply system for an internal combustion engine comprised of a combustion chamber, an air charging system for delivering at least an air charge to said combustion chamber, a fuel charging system for delivering a fuel charge to said combustion chamber, an exhaust system for discharging a burnt charge from said combustion chamber, an ignition system including a spark plug for firing a charge in said combustion chamber, and a control system for controlling at least some of said engine systems, said control system controlling the amount of fuel delivered to said combustion chamber by said fuel charging system for each cycle including supplying fuel to said combustion chamber under at least some running conditions so that the fuel is delivered in a first segment at least in part occurring before combustion occurs and a second segment beginning at a time after the spark plug is fired and after the delivery of the first segment has been completed.

2. A fuel supply system for an internal combustion engine as set forth in claim 1, wherein under some running conditions the control system supplies the fuel to the combustion chamber all in one segment.

3. A fuel supply system for an internal combustion engine as set forth in claim 2, wherein the two-segment fuel supply is provided during a condition when knocking is likely to occur in the combustion chamber.

4. A fuel supply system for an internal combustion engine as set forth in claim 3, wherein the amount of fuel supplied during the first segment is varied in response to engine speed.

5. A fuel supply system for an internal combustion engine comprised of a combustion chamber, an air charging system for delivering at least an air charge to said combustion chamber, a fuel charging system for delivering a fuel charge to said combustion chamber, an exhaust system for discharging a burnt charge from said combustion chamber, and a control system for controlling at least some of said engine systems, said control system controlling the amount of fuel delivered to said combustion chamber by said fuel charging system for each cycle including supplying fuel to said combustion chamber under at least some running conditions so that the fuel is delivered in a first segment at least in part occurring before combustion occurs and a second segment beginning after combustion begins and under some other running conditions supplies the fuel to the combustion chamber all in one segment, said two segment fuel supply being provided during a condition when knocking is likely to occur in the combustion chamber, the amount of fuel supplied during the first segment of the two segment fuel supply being varied in response to engine speed and the amount of fuel supplied during the first segment is decreased when the load on the engine is increased.

6. A fuel supply system for an internal combustion engine as set forth in claim 5, wherein the amount of fuel supplied during the first segment is decreased as the engine speed increases.

7. A fuel supply system for an internal combustion engine as set forth in claim 6, wherein the amount of fuel supplied during the first segment is decreased when the load on the engine is increased.

8. A fuel supply system for an internal combustion engine comprised of a combustion chamber, an air charging system for delivering at least an air charge to said combustion chamber, a fuel charging system for delivering a fuel charge to said combustion chamber, an exhaust system for discharging a burnt charge from said combustion chamber, and a control system for controlling at least some of said engine systems, said control system controlling the amount of fuel delivered to said combustion chamber by said fuel charging system for each cycle including supplying fuel to said combustion chamber under at least some running conditions so that the fuel is delivered in a first segment at least in part occurring before combustion occurs and a second segment beginning after combustion begins and under some other running conditions supplies the fuel to the combustion chamber all in one segment, said two segment fuel supply being provided during a condition when knocking is likely to occur in the combustion chamber, and the amount of fuel supplied in the first segment is greater than the amount of fuel supplied in the second segment.

9. A fuel supply system for an internal combustion engine as set forth in claim 8, wherein the amount of fuel supplied during the first segment is varied in response to engine speed.

10. A fuel supply system for an internal combustion engine as set forth in claim 8, wherein the amount of fuel supplied during the first segment is decreased when the load on the engine is increased.

11. A fuel supply system for an internal combustion engine as set forth in claim 9, wherein the amount of fuel supplied during the first segment is decreased as the engine speed increases.

12. A fuel supply system for an internal combustion engine as set forth in claim 11, wherein the amount of fuel supplied during the first segment is decreased when the load on the engine is increased.

13. A fuel supply system for an internal combustion engine comprised of a combustion chamber, an air charging system for delivering at least an air charge to said combustion chamber, a fuel charging system for delivering a fuel charge to said combustion chamber, an exhaust system for discharging a burnt charge from said combustion chamber, and a control system for controlling at least some of said engine systems, said control system controlling the amount of fuel delivered to said combustion chamber by said fuel charging system for each cycle including supplying fuel to said combustion chamber under at least some running conditions so that the fuel is delivered in a first segment at least in part occurring before combustion occurs and a second segment beginning after combustion begins and under some other running conditions supplies the fuel to the combustion chamber all in one segment, said two segment fuel supply being provided during a condition when knocking is likely to occur in the combustion chamber, a spark plug for firing a charge in said combustion chamber and wherein said control system also controls the timing of spark firing.

14. A fuel supply system for an internal combustion engine as set forth in claim 13, wherein the timing of the spark firing is retarded if an incipient knocking condition is sensed.

15. A fuel supply system for an internal combustion engine as set forth in claim 14, wherein the spark timing is retarded only if the controlling of the fuel injection amounts in segments is not effective to prevent knocking.

16. A fuel supply system for an internal combustion engine as set forth in claim 1, wherein the two segments of fuel supply is supplied so as to control the maximum pressure in the combustion chamber.

17. A fuel supply system for an internal combustion engine as set forth in claim 16, wherein the second fuel supply segment is not initiated until after peak pressure is reached in the combustion chamber.

18. A fuel supply system for an internal combustion engine as set forth in claim 1, wherein the amount of fuel supplied during the first segment is varied in response to engine speed.

19. A fuel supply system for an internal combustion engine comprised of a combustion chamber, an air charging system for delivering at least an air charge to said combustion chamber, a fuel charging system for delivering a fuel charge to said combustion chamber, an exhaust system for discharging a burnt charge from said combustion chamber, and a control system for controlling at least some of said engine systems, said control system controlling the amount of fuel delivered to said combustion chamber by said fuel charging system for each cycle including supplying fuel to said combustion chamber under at least some running conditions so that the fuel is delivered in a first segment at least in part occurring before combustion occurs and a second segment beginning after combustion begins, and the amount of fuel supplied during the first segment is decreased when the load on the engine is increased.

20. A fuel supply system for an internal combustion engine as set forth in claim 18, wherein the amount of fuel supplied during the first segment is decreased as the engine speed increases.

21. A fuel supply system for an internal combustion engine as set forth in claim 20, wherein the amount of fuel supplied during the first segment is decreased when the load on the engine is increased.

22. A fuel supply system for an internal combustion engine comprised of a combustion chamber, an air charging system for delivering at least an air charge to said combustion chamber, a fuel charging system for delivering a fuel charge to said combustion chamber, an exhaust system for discharging a burnt charge from said combustion chamber, and a control system for controlling at least some of said engine systems, said control system controlling the amount of fuel delivered to said combustion chamber by said fuel charging system for each cycle including supplying fuel to said combustion chamber under at least some running conditions so that the fuel is delivered in a first segment at least in part occurring before combustion occurs and a second segment beginning after combustion begins, and the amount of fuel supplied in the first segment is greater than the amount of fuel supplied in the second segment.

23. A fuel supply system for an internal combustion engine as set forth in claim 22, wherein the amount of fuel supplied in the second segment is varied in response to engine temperature.

24. A fuel supply system for an internal combustion engine as set forth in claim 23, wherein the amount of fuel supplied in the second segment is decreased in response to a decrease in engine temperature.

25. A fuel supply system for an internal combustion engine as set forth in claim 1, wherein the control system also controls the timing of spark firing.

26. A fuel supply system for an internal combustion engine as set forth in claim 25, wherein the timing of the spark firing is retarded if an incipient knocking condition is sensed.

27. A fuel supply system for an internal combustion engine as set forth in claim 26, wherein the spark timing is retarded only if the controlling of the fuel injection amounts in segments is not effective to prevent knocking.

28. A method of operating an internal combustion engine comprised of a combustion chamber, an air charging system for delivering at least an air charge to said combustion chamber, a fuel charging system for delivering a fuel charge to said combustion chamber, an exhaust system for discharging a burnt charge from said combustion chamber, an ignition system including a spark plug for firing a charge in said combustion chamber, and a control system for controlling at least some of said engine systems, said method comprising the steps of controlling the amount of fuel delivered to said combustion chamber by said fuel charging system for each cycle including supplying fuel to said combustion chamber under at least some running conditions so that the fuel is delivered in a first segment at least in part occurring before combustion occurs and a second segment beginning at a time after the spark plug is fired and after the delivery of the first segment has been completed.

29. A method of operating an internal combustion engine as set forth in claim 28, wherein under some running conditions the fuel is supplied to the combustion chamber all in one segment.

30. A method of operating an internal combustion engine as set forth in claim 29, wherein the two-segment fuel supply is provided during a condition when knocking is likely to occur in the combustion chamber.

31. A method of operating an internal combustion engine as set forth in claim 30, wherein the amount of fuel supplied during the first segment is varied in response to engine speed.

32. A method of operating an internal combustion engine comprised of a combustion chamber, an air charging system for delivering at least an air charge to said combustion chamber, a fuel charging system for delivering a fuel charge to said combustion chamber, an exhaust system for discharging a burnt charge from said combustion chamber, and a control system for controlling at least some of said engine systems, said method comprising the steps of controlling the amount of fuel delivered to said combustion chamber by said fuel charging system for each cycle including supplying fuel to said combustion chamber under at least some running conditions so that the fuel is delivered in a first segment at least in part occurring before combustion occurs and a second segment beginning after combustion begins when knocking is likely to occur in the combustion chamber, the amount of fuel supplied during the first segment being varied in response to engine speed and the amount of fuel supplied during the first segment is decreased when the load on the engine is increased.

33. A method of operating an internal combustion engine as set forth in claim 32, wherein the amount of fuel supplied during the first segment is decreased as the engine speed increases.

34. A method of operating an internal combustion engine as set forth in claim 33, wherein the amount of fuel supplied during the first segment is decreased when the load on the engine is increased.

35. A method of operating an internal combustion engine as set forth in claim 33, wherein the amount of fuel supplied in the first segment is greater than the amount of fuel supplied in the second segment.

36. A method of operating an internal combustion engine as set forth in claim 35, wherein the amount of fuel supplied during the first segment is varied in response to engine speed.

37. A method of operating an internal combustion engine as set forth in claim 35, wherein the amount of fuel supplied during the first segment is decreased when the load on the engine is increased.

38. A method of operating an internal combustion engine as set forth in claim 36, wherein the amount of fuel supplied during the first segment is decreased as the engine speed increases.

39. A method of operating an internal combustion engine as set forth in claim 38, wherein the amount of fuel supplied during the first segment is decreased when the load on the engine is increased.

40. A method of operating an internal combustion engine comprised of a combustion chamber, an air charging system for delivering at least an air charge to said combustion chamber, a fuel charging system for delivering a fuel charge to said combustion chamber, an exhaust system for discharging a burnt charge from said combustion chamber, and a control system for controlling at least some of said engine systems, said method comprising the steps of controlling the amount of fuel delivered to said combustion chamber by said fuel charging system for each cycle including supplying fuel to said combustion chamber during a condition when knocking is likely to occur in the combustion chamber the fuel is delivered in a first segment at least in part occurring before combustion occurs and a second segment beginning after combustion and under some other running conditions the fuel is supplied to the combustion chamber all in one segment, and a spark plug for firing a charge in the combustion chamber and wherein the timing of spark firing is also controlled.

41. A method of operating an internal combustion engine as set forth in claim 40, wherein the timing of the spark firing is retarded if an incipient knocking condition is sensed.

42. A method of operating an internal combustion engine as set forth in claim 41, wherein the spark timing is retarded only if the controlling of the fuel injection amounts in segments is not effective to prevent knocking.

43. A method of operating an internal combustion engine as set forth in claim 28, wherein the two segments of fuel supply is supplied so as to control the maximum pressure in the combustion chamber.

44. A method of operating an internal combustion engine as set forth in claim 43, wherein the second fuel supply segment is not initiated until after peak pressure is reached in the combustion chamber.

45. A method of operating an internal combustion engine comprised of a combustion chamber, an air charging system for delivering at least an air charge to said combustion chamber, a fuel charging system for delivering a fuel charge to said combustion chamber, an exhaust system for discharging a burnt charge from said combustion chamber, and a control system for controlling at least some of said engine systems, said method comprising the steps of controlling the amount of fuel delivered to said combustion chamber by said fuel charging system for each cycle including supplying fuel to said combustion chamber under at least some running conditions so that the fuel is delivered in a first segment at least in part occurring before combustion occurs and a second segment beginning after combustion and the amount of fuel supplied during the first segment is varied in response to engine speed.

46. A method of operating an internal combustion engine comprised of a combustion chamber, an air charging system for delivering at least an air charge to said combustion chamber a fuel charging system for delivering a fuel charge to said combustion chamber, an exhaust system for discharging a burnt charge from said combustion chamber, and a control system for controlling at least some of said engine systems, said method comprising the steps of controlling the amount of fuel delivered to said combustion chamber by said fuel charging system for each cycle including supplying fuel to said combustion chamber under at least some running conditions so that the fuel is delivered in a first segment at least in part occurring before combustion occurs and a second segment beginning after combustion and the amount of fuel supplied during the first segment is decreased when the load on the engine is increased.

47. A method of operating an internal combustion engine as set forth in claim 45, wherein the amount of fuel supplied during the first segment is decreased as the engine speed increases.

48. A method of operating an internal combustion engine as set forth in claim 47, wherein the amount of fuel supplied during the first segment is decreased when the load on the engine is increased.

49. A method of operating an internal combustion engine comprised of a combustion chamber an air charging system for delivering at least an air charge to said combustion chamber, a fuel charging system for delivering a fuel charge to said combustion chamber an exhaust system for discharging a burnt charge from said combustion chamber, and a control system for controlling at least some of said engine systems, said method comprising the steps of controlling the amount of fuel delivered to said combustion chamber by said fuel charging system for each cycle including supplying fuel to said combustion chamber under at least some running conditions so that the fuel is delivered in a first segment at least in part occurring before combustion occurs and a second segment beginning after combustion and the amount of fuel supplied in the first segment is greater than the amount of fuel supplied in the second segment.

50. A method of operating an internal combustion engine as set forth in claim 49, wherein the amount of fuel supplied in the second segment is varied in response to engine temperature.

51. A method of operating an internal combustion engine as set forth in claim 50, wherein the amount of fuel supplied in the second segment is decreased in response to a decrease in engine temperature.

52. A method of operating an internal combustion engine as set forth in claim 28, wherein the timing of spark firing is also controlled.

53. A method of operating an internal combustion engine as set forth in claim 52, wherein the timing of the spark firing is retarded if an incipient knocking condition is sensed.

54. A method of operating an internal combustion engine as set forth in claim 53, wherein the spark timing is retarded only if the controlling of the fuel injection amounts in segments is not effective to prevent knocking.

* * * * *